Jan. 1, 1935.  F. S. FARLEY ET AL  1,986,770
PANEL CUTTING AND SHIP LAPPING
Filed Dec. 24, 1931   6 Sheets-Sheet 1
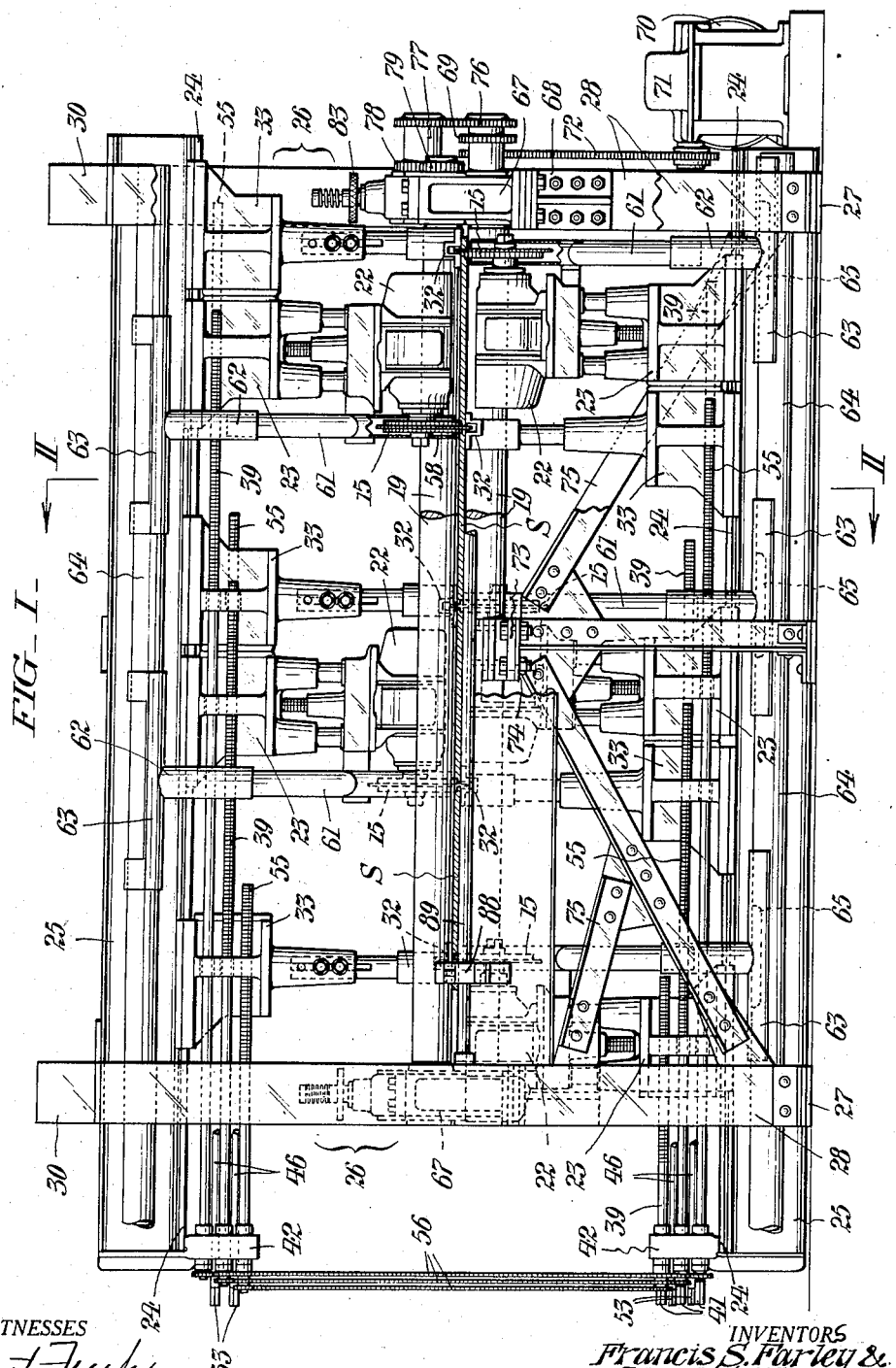

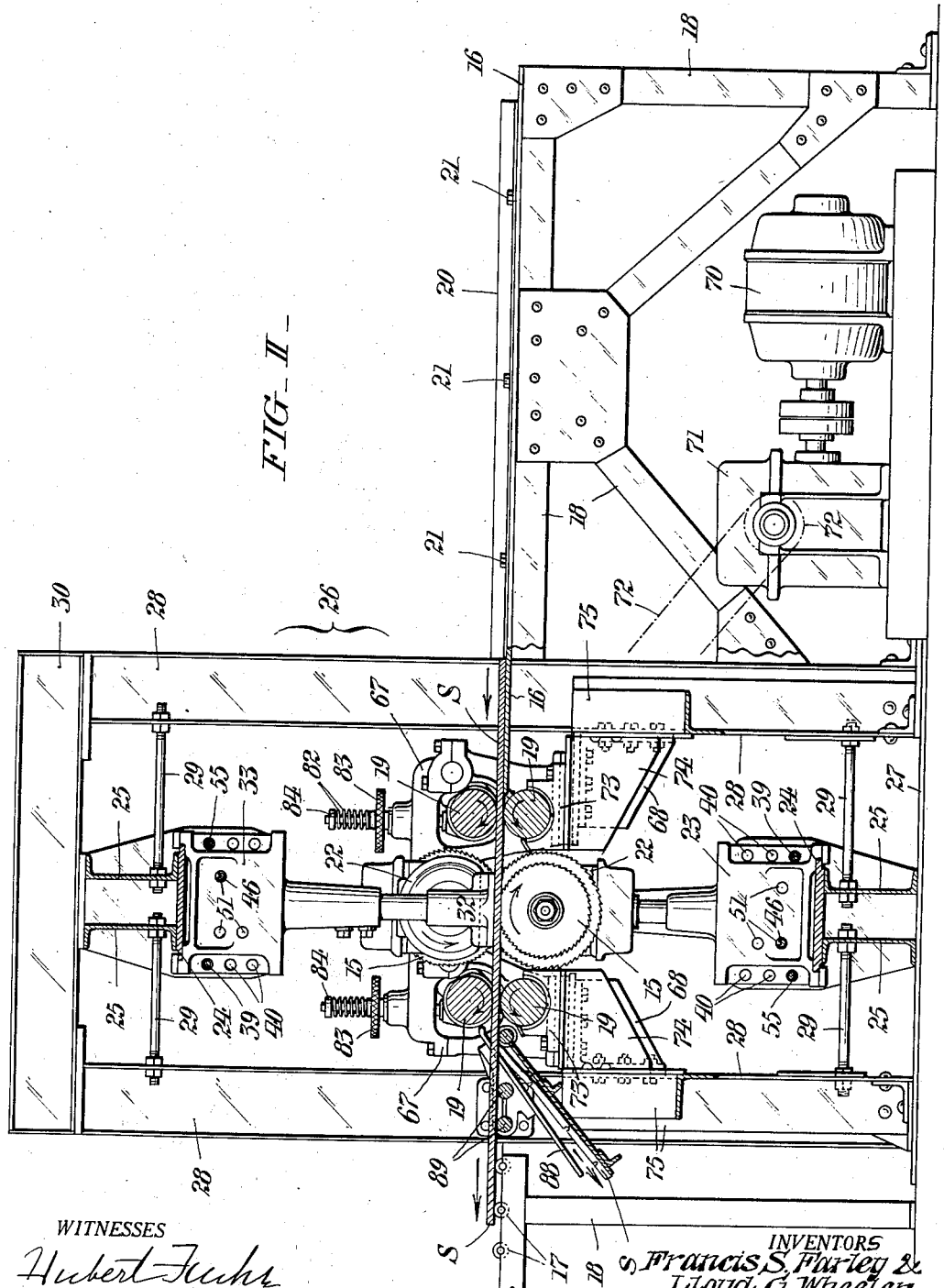

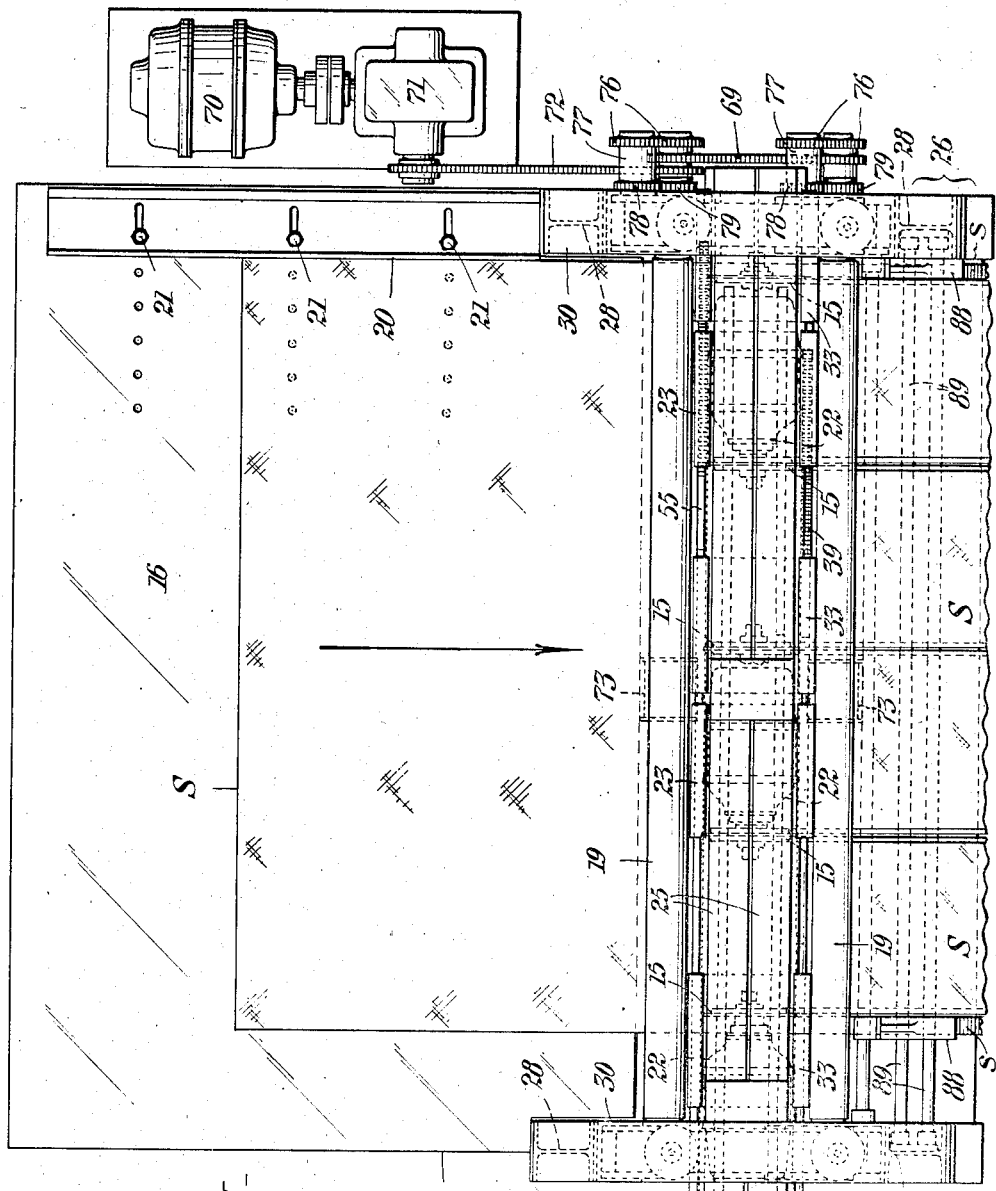

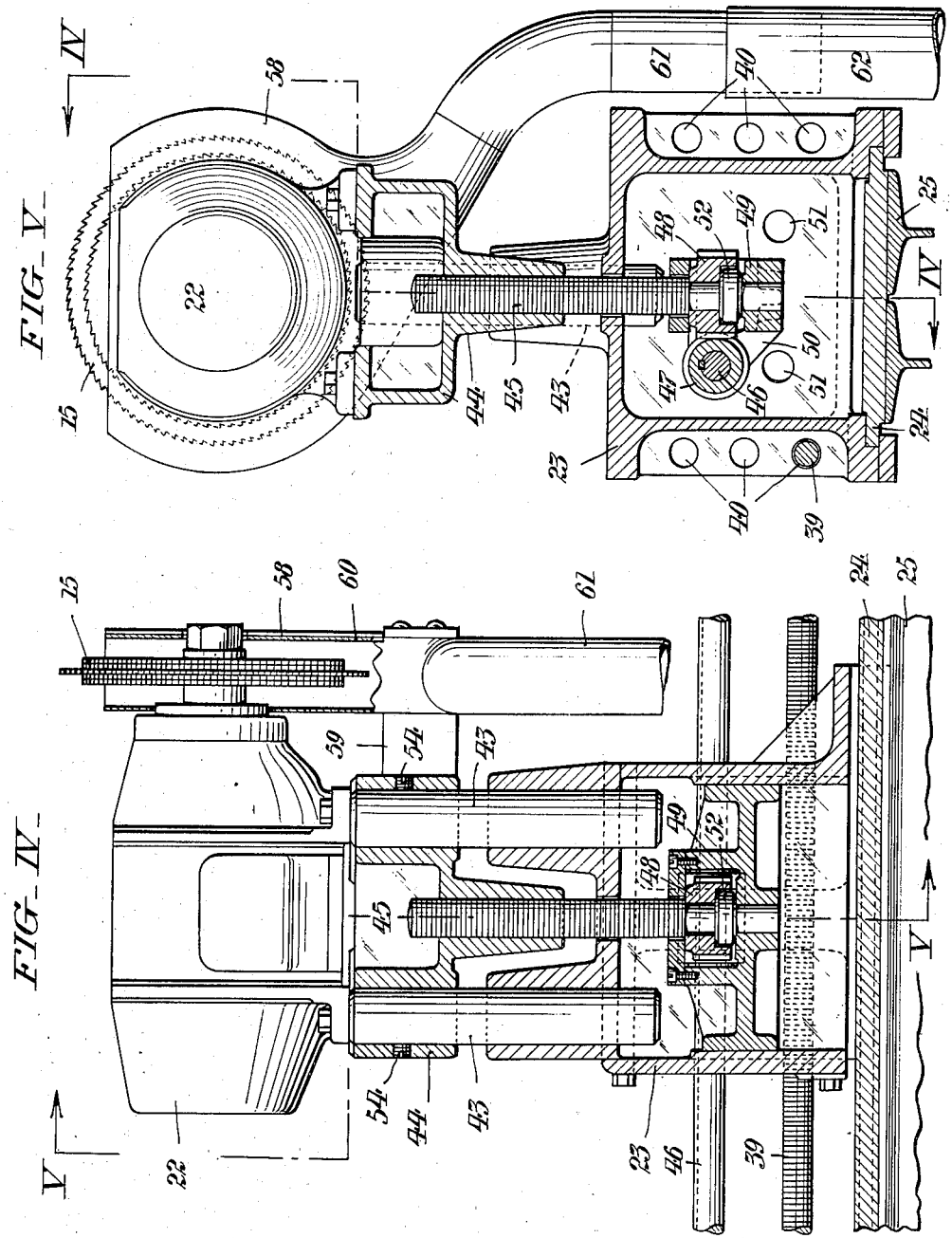

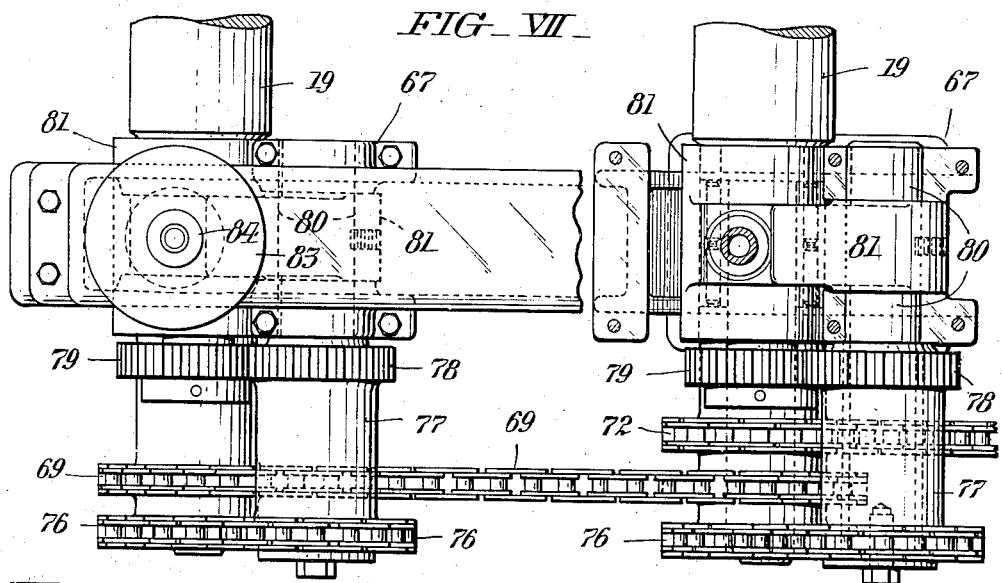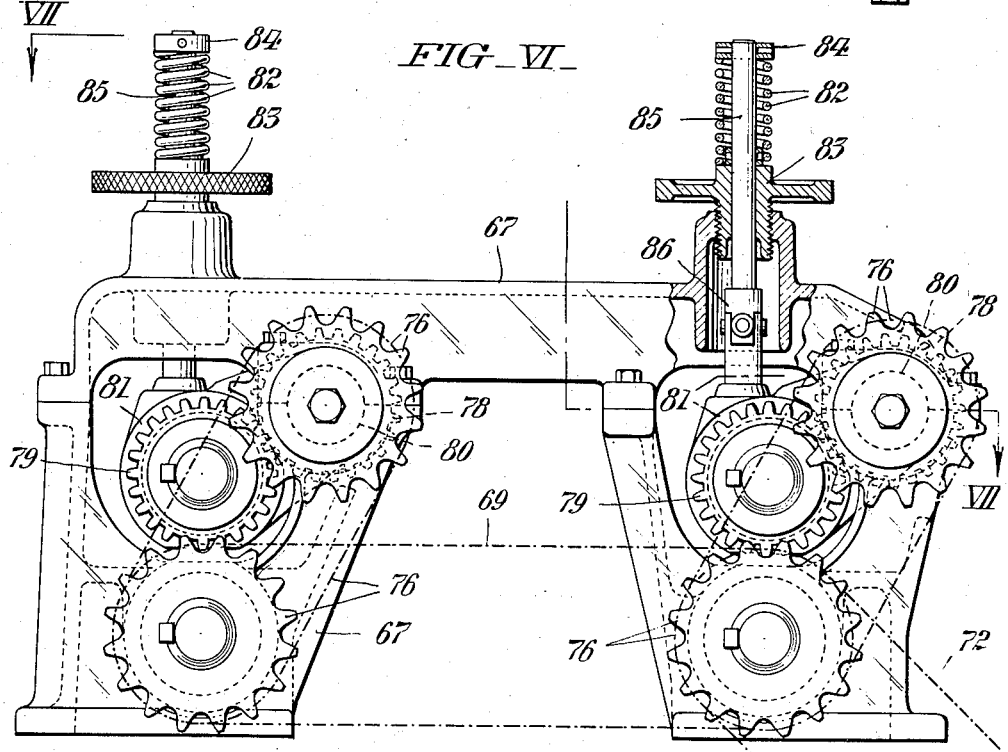

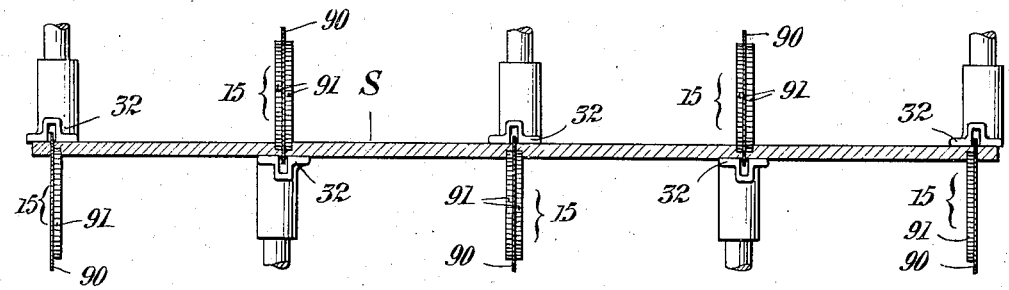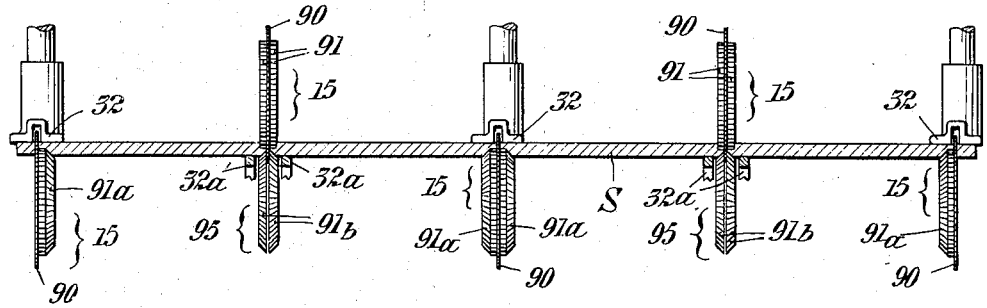

Patented Jan. 1, 1935

1,986,770

UNITED STATES PATENT OFFICE 1,986,770

PANEL CUTTING AND SHIP-LAPPING

Francis S. Farley, Trenton, N. J., and Lloyd G. Wheeler, York, Pa., assignors to B. M. Root Co., York, Pa., a corporation of Pennsylvania Application December 24, 1931, Serial No. 583,032

8 Claims. (Cl. 144—41)

This invention relates to panel cutting and the like, being applicable to sawing up, trimming, grooving, and otherwise cutting sheet material, and especially to cutting sheets or panels with rabbeted or ship-lap edges. We aim to do this conveniently, rapidly, inexpensively and with the utmost economy of material. The invention is adaptable and advantageous for insulation, building board, homogeneous hardwood board, paper, wood and fiber pulp board, and other sheet materials that can be sawed or cut with milling cutters or grinding wheels. Various advantages that can be realized through the invention will appear from our description hereinafter of a selected and preferred embodiment, which is specially useful for trimming the edges of fiber board sheets and cutting them into parallel-edged strips, as well as for bringing the edges to ship-lap formation, or cutting grooves in the sheets or strips parallel with their edges.

In the drawings, Fig. I is a front elevation of a machine conveniently embodying our invention.

Fig. II is an "end" or side elevation from the right of Fig. I, with certain parts in vertical section as indicated by the line and arrows II—II in Fig. I.

Fig. III is a plan view of the machine.

Fig. IV is a side view of one of the rotary cutters with its driving motor and associated parts, with certain parts in vertical section as indicated by the line and arrows IV—IV in Fig. V.

Fig. V is a similar view at right angles to Fig. IV, with certain parts in vertical section as indicated by the line and arrows V—V in Fig. IV.

Fig. VI is a side view of a portion of the machine from the right of Figs. I and III, with certain parts in vertical section and certain parts omitted.

Fig. VII is a corresponding plan view, with certain parts in horizontal section as indicated by the line and arrows VII—VII in Fig. VI.

Fig. VIII is a fragmentary diagrammatic view of a sheet passing through the machine and the cutters acting thereon, etc., taken similarly to Fig. I with the sheet in section through the axis of the cutters.

Fig. IX is a similar view showing a different set of cutters.

Fig. X is a diagrammatic view at right angles to Figs. VIII and IX.

Fig. XI is a similar view showing a different relative arrangement of the cutters.

Fig. XII is a horizontal sectional view illustrating the product of Fig. VIII as used in the construction of a wall; and, Fig. XIII is a similar view showing the product of Fig. IX.

The machine here shown (Figs. I, II, and III) has a horizontal cutting bed or table for the sheet material S, with a gap or opening across it for a series of rotary cutters 15. The front portion of the table, over which the sheet material approaches the cutters 15, consists of a horizontal metal plate 16, while the rear portion consists of a horizontal series of free anti-friction rollers 17. Both plate 16 and rollers 17 are supported at a convenient height by suitable substructure or framing 18. Preferably, the sheet material S is definitely controlled during the action of the cutters 15 on it, as by means of transversely extending rotary feed rolls 19 located close in front of and behind the cutters, so as to assure straight cuts. As shown in Figs. I–III, there is an angle-bar guide stop 20 for the entering sheet S along one edge of the plate 16, adjustably secured by bolt and slot fastenings 21 through its horizontal flange.

The cutters 15 may be abrasive or shearing discs of any suitable type, and are here shown as circular saws associated with (grooving) milling cutters. They are directly driven by individual (electric) motors 22 mounted on carriages 23 which are movable on track plates or ways 24 supported by transverse I-beams 25, 25 mounted above and below the sheet S, on rectangular frames 26, 26 at the sides of the table. At each side frame 26, the I-beam supports 25, 25 of the lower way-plate 24 are secured to the horizontal (plate) 27 interconnecting the lower ends of the side-frame I-uprights 28, 28, and are braced by stay-rods 29, 29 extending from their webs to the flanges of said uprights 28, 28. The I-beam supports 25, 25 of upper way-plate 24 are similarly mounted on the (I-beam) horizontal 30 interconnecting the upper ends of the uprights 28, 28 and are similarly braced. As here shown, there are two cutters 15 above the sheet S, and three below it: however, the number and arrangement of cutters can be varied as desired for the work to be done from time to time. The cutters 15 can be adjusted or set at any desired positions or intervals along the ways 24, so as to give exactly the cuts desired. Preferably, the ways 24 project through and beyond one or both of the side frames 26, 26, to allow cutters 15 to be set clear out to the limit of the width between these frames. As shown in Figs. I and II, there are supports or presser feet 32 at opposite sides of the sheet S from the cutters 15, to sustain the sheet against the thrust due to the cutters. Like the cutters 15, the supports 32 are mounted on carriages 33 movable along the ways 24.

As shown in Figs. I, II, III, IV and V, there are a plurality of feed screws or threaded shafts 39 extending along the ways 24, one in threaded engagement with each of the saw carriages 23. Each carriage 23 has openings 40 (Fig. V) large enough to clear the screws 39 of the other carriages,—which need not, of course, be threaded their entire length. The end of each screw 39 is squared at 41, outside of the fixed thrust block 42 in which it is journaled (Figs. I and III), to take a crank handle for turning the screw. Each motor 22 with its saw 15 is vertically adjustable relative to its carriage 23, so that any saw may be lowered out of action when not required to cut. As shown in Figs. IV and V, each motor 22 has two vertical guide rods 43 that work in corresponding bores in the carriage 23, and also has a base 44 threaded to take a vertical adjusting screw 45 rotatably mounted on the carriage 23. Each screw 45 is operated by a shaft 46 extending along the ways 24, through a worm 47 slidably splined on the shaft and a worm gear 48 keyed to the screw 45. The shaft 46 and the plain lower end of the screw 45 are journaled in a part 49 extending across the interior of the hollow carriage structure 23, and the worm 47 is engaged between journal lugs 50, on this part 49, at either side of the gear 48. Each carriage 23 has openings 51 large enough to clear the shafts 46 of the other carriages. The screw 45 has a thrust shoulder 52, seated (with gear 48) in an opening in the part 49. The end of each shaft 46 is squared at 53 (Fig. III) to take a crank handle (not shown) for turning the shaft. As shown in Fig. IV, the motor 22 can be adjusted relative to its base 44 by sliding its rods 43 through the base, and can be secured by set-screws 54.

As shown in Figs. I and II, the presser feet or supports 32 (which are appropriately grooved to accommodate the toothed margins of the saws at 15) are carried by rods which are vertically adjustable in sockets on the carriages 33, and can be firmly secured by set-screws or clamp-screws. For shifting the support carriages 33 along the ways 24, there are feed screws or threaded shafts 55, similar to the screws 39 for the carriages 23. Provision is shown for shifting the cutter carriages 23 and the corresponding support carriages 33 in unison, at a single operation, by means of sprocket chain connections 56 between the screw shafts 39 and 55 of the corresponding carriages (Fig. I).

Around the cutter 15 (Figs. IV and V) is a casing or dust guard 58, mounted on a bracket arm 59, on the motor base 44, and extending close up to the sheet S when the cutter 15 is in its raised active position. The guard 58 has a detachable side plate 60 whose removal allows the cutter 15 to be removed. The guard 58 also has a suction outlet pipe 61 that telescopes with a pipe 62 having a curved shield 63 at its mouth (Fig. I), which shield travels on a suction conduit 64 extending alongside the ways 24. The conduit 64 has elongated openings 65 adapted to overlap the pipe 62 in any position of the latter within the required range of adjustment of each cutter 15, and to be covered by the shield 63 at all times.

The lower rolls 19 (Figs. I, VI and VII) are journaled in a hollow yoke structure 67 whose ends are mounted on brackets 68 on the uprights 28, 28. The lower rolls 19, 19 are interconnected by a chain and sprocket drive 69, and the lower right hand roll 19 is driven by an electric motor 70 (Fig. III) through reduction gearing 71 and a chain and sprocket connection 72. To minimize deflection of the lower rolls 19, they are provided with intermediate segmental bearings 73, mounted on brackets 74 attached to (channel) horizontals 75 extending between opposite side uprights 28, 28 (Figs. I–III). The upper rolls 19, 19 are movably mounted, so as to rest by gravity on the sheet S; they are driven by chain and sprocket connections 76 to rotary sleeves 77 which have gears 78 meshing with the gears 79 on the ends of the upper rolls 19, 19. The sleeves 77 are journaled on short shafts 80 mounted in the structure 67. As here shown, each end of each roll 19 is journaled in one end of a short link 81 pivoted on the shaft 80. A helical compression spring 82 mounted above the yoke structure 67 partly counteracts gravity, thus reducing the pressure of the roll 19 downward upon the material S. Roller bearings for the roll 19 in the link 81 minimize the pressure required to cause the roll to turn by friction with the material. As shown in Fig. VI, the lower end of the spring 82 rests on a (hollow) abutment screw 83 adjustable in the structure 67, while its upper end engages a collar 84 fast on a stem 85 that extends down through the screw 83 and is connected to the end of the link 81 through a universal joint 86. By adjusting the screw 83, the normal space between the rolls 19, 19 may be adjusted so as to be just a little less than the thickness of the board S to be cut. This obviates excessive pressure on thick sheets, and allows of adjusting the machine to take sheets ranging from $\tfrac{1}{16}''$ to $2''$ in thickness.

As shown in Figs. II and III, sloping deflectors 88, 88 are mounted on transverse rods 89 spanned between the side frames 26, 26, to deflect the marginal trim s from the sheet S downward under the table to any convenient point or means of disposal.

As shown in Fig. III, the cutter 15 at the right hand side of the machine is almost in line with the edge of the corresponding deflector 88, so as to cover the trim s of the sheet S as it comes from the saw and guide the trim below the table. The deflectors 88, 88 can be adjusted transversely of the machine along the rods 89, according to the setting of the corresponding cutters 15.

When the machine is in operation, the cutters 15 and the feed rolls 19 run continuously. The rolls 19 do not mark or mar the sheets S, however, because in operation they soon clean themselves and acquire a high polish. The sheets S are held firmly by the cooperating rolls 19, 19 while being cut,—most of the time both in front of and behind the cutters. The right-hand entrance edge cutter 15 (Fig. I) may always be in one relation with the guide stop 20, (Fig. III); whereas the left-hand edge cutter can be adjusted as desired,—the trim on this side varying accordingly. In both cases, the trim is separated from the rest of the sheet as it is cut. The dust and chips from the saw cutters 15 is likewise removed at its very source.

The driving of the cutters 15 by individual motors 22 not only results in a direct variation of the available motor power with variation in the number of cutters in service, and thus gives a better power factor, but also allows of easier access and easier changing of cutters, and adjustment of the number in service: i. e., it avoids the complications and labor encountered with a plurality of saws mounted on a common arbor, and the necessity of using split saws. As already explained, the cutters 15 and supports 32 can be very conveniently adjusted and controlled, from outside of the machine.

Figs. VIII and X illustrate the use of the machine to cut and trim a sheet S into four strips of equal width with plain ship-lap edges. As here shown, each of the cutters 15 comprises a circular saw disc 90 with a milling cutter disc 91 against one or both of its sides: i. e., each edge-trimming saw 90 has a single milling cutter 91, at its side away from the sheet edge, while each of the other saws 90 has milling cutters 91, 91 at both its sides. With each of the cutters 15 is associated a presser-foot or support 32. The relations of the parts to one another and to the feed rolls 19 and the sheet S are shown in Fig. X. The saws 90 of the cutters 15 being at uniform intervals and at opposite sides of the sheet S in alternation, the strips are of uniform width and are oppositely rabbeted on their edges. Fig. XII shows how strips of fiber board ship-lapped as in Figs. VIII and X are assembled in a plastered wall, nailed to studding 93, and covered with plaster 95.

Figs. IX and XI illustrate the use of such a machine to make board with edges bevelled as well as ship-lapped. Here each milling cutter 91a of the (edge-trimming and central) lower cutters 15 has a cylindrical periphery with a (45°) conical bevel adjacent it; and these lower cutters 15 are associated with the same upper supports 32 as in Figs. VIII and X. The two upper cutters 15 are the same as in Figs. VIII and X; but their corresponding supports 32a are double, with pairs of oppositely-facing conical-edged milling cutter discs 91b between, forming a double conical or (90°) V-cutter 95. Fig. IX shows the cutting alignment of coacting upper cutters 15 and these extra lower cutters 95, and Fig. XI shows their axial relation: i. e., their axes are not directly opposite, but somewhat offset in the direction of cut, so that they both cut to the median plane of the sheet S without any possibility of clashing. Accordingly, the edges of each strip produced are different: i. e., while rabbeted toward opposite sides, they are bevelled toward the same side. Fig. XIII shows how such strips of fiber board are assembled in use, nailed on studding 93, and plastered over at 95. The bevels of interfitting edges coact to form (90°) V-grooves 96 that help to hold the plaster 95.

Having thus described our invention, we claim:

1. A machine of the character described, for cutting up sheet material, comprising upper and lower ways extending substantially parallel with the plane of the sheet material to be cut, above and below it, and substantially perpendicular to the planes of cutting; carriages individually movable along said upper and lower ways, and provided with guides extending substantially perpendicular to the plane of the sheet material; rotary cutters with driving motors therefor on some of said upper and lower carriages, independently movable up and down along their said guides relative to the plane of the sheet material; and lower and upper supports on other of said lower and upper carriages, for sustaining the sheet material opposite said cutters, also independently movable up and down along their guides.

2. A machine of the character described, for cutting up sheet material, comprising upper and lower ways extending substantially parallel with the plane of the sheet material to be cut, above and below it, and substantially perpendicular to the planes of cutting; carriages individually movable along said upper and lower ways; rotary cutters with driving motors therefor on some of said upper and lower carriages; and lower and upper supports on other of said carriages, for sustaining the sheet material opposite said cutters, the supports on such carriages engaging the sheet material at both sides of the corresponding cutters, respectively, and accommodating the active margin of the latter, when penetrating the sheet material, between such points of engagement.

3. A machine of the character described, for cutting up sheet material, comprising upper and lower ways extending substantially parallel with the plane of the sheet material to be cut, above and below it, and substantially perpendicular to the planes of cutting; carriages individually movable along said upper and lower ways; rotary cutters with driving motors therefor on some of said upper and lower carriages; lower and upper supports on other of said lower and upper carriages, for sustaining the sheet material opposite said cutters; and means for concurrently and correlatively adjusting corresponding cutter and support carriages along their respective ways, so as to keep them in proper correlation when varying the locations of cuts.

4. A machine of the character described, for cutting up sheet material, comprising upper and lower ways extending substantially parallel with the plane of the sheet material to be cut, above and below it, and substantially perpendicular to the planes of cutting; carriages individually movable along said upper and lower ways, and provided with guides extending substantially perpendicular to the plane of the sheet material; rotary cutters with driving motors therefor on some of said upper and lower carriages, independently movable up and down along their said guides relative to the plane of the sheet material; lower and upper supports on other of said lower and upper carriages, for sustaining the sheet material opposite said cutters, also independently movable up and down along their guides; and means for concurrently and correlatively adjusting corresponding cutter and support carriages along their respective ways, so as to keep them in proper correlation when varying the locations of cuts.

5. A machine of the character described, for cutting sheet material, comprising upper and lower ways, carriages on said ways, bearings on corresponding ends of said ways, screw shafts in said bearings for shifting said carriages along the ways, means interconnecting the screw shafts of corresponding carriages on the upper and lower ways so that said carriages will travel together, a rotary cutter with a driving motor therefor on one carriage of each such pair, and a cooperating support on the other carriage for sustaining the sheet material opposite said cutter.

6. A machine of the character described, for cutting sheet material, comprising upright open side-frames, upper and lower ways mounted at top and bottom of said frames and projecting through at least one of them, carriages on said ways individually adjustable along them through at least one of said frames, and rotary cutters with driving motors therefor on such carriages.

7. A machine of the character described, for cutting sheet material, comprising upright open side-frames, upper and lower ways mounted at top and bottom of said frames and projecting through at least one of them, carriages on said ways individually adjustable along them through at least one of said frames, rotary cutters with driving motors therefor on such carriages, and sets of cooperating feed rolls carried by the frame uprights for engaging the sheet material.

8. A machine of the character described, for cutting sheet material, comprising upright open side frames, upper and lower ways mounted at top and bottom of said frames and projecting through at least one of them, carriages on said ways, bearings on corresponding ends of said ways, screw shafts in said bearings for shifting said carriages along the ways, means interconnecting the screw shafts of corresponding carriages on the upper and lower ways so that said carriages will travel together, a rotary cutter with a driving motor therefor on one carriage of each such pair, and a cooperating support on the other carriage for sustaining the sheet material opposite said cutter.

FRANCIS S. FARLEY.
LLOYD G. WHEELER.